(12) United States Patent
Foshage et al.

(10) Patent No.: US 7,061,153 B1
(45) Date of Patent: Jun. 13, 2006

(54) HIGH SPEED MOTOR COILS

(76) Inventors: Gerald K. Foshage, 74 Pinehurst Dr., Boxford, MA (US) 01921; Raymond F. Griswold, 145 W. Briles Rd., Phoenix, AZ (US) 85027

( * ) Notice: Subject to any disclaimer, the term of this patent is extended or adjusted under 35 U.S.C. 154(b) by 0 days.

(21) Appl. No.: 11/045,785

(22) Filed: Jan. 28, 2005

Related U.S. Application Data

(63) Continuation of application No. 10/635,055, filed on Aug. 6, 2003, now abandoned, which is a continuation of application No. 09/956,315, filed on Sep. 19, 2001, now abandoned.

(51) Int. Cl.
  *H02K 3/00* (2006.01)
(52) U.S. Cl. ..................................... 310/180
(58) Field of Classification Search ................ 310/180
  See application file for complete search history.

(56) References Cited

U.S. PATENT DOCUMENTS

| | | | | |
|---|---|---|---|---|
| 946,105 A * | 1/1910 | Burleigh | ...................... | 310/180 |
| 1,326,502 A * | 12/1919 | Hentzell | ...................... | 310/180 |
| 2,404,129 A * | 7/1946 | Flatland | ...................... | 310/180 |
| 2,531,672 A * | 11/1950 | King | ............................ | 92/244 |
| 2,894,158 A * | 7/1959 | Pace | ........................... | 310/180 |
| 4,130,769 A * | 12/1978 | Karube | ......................... | 310/46 |
| 4,868,443 A * | 9/1989 | Rossi | ......................... | 310/268 |
| 4,924,128 A * | 5/1990 | Vaillant de Guelis et al. | ... | 310/156.26 |
| 5,325,007 A * | 6/1994 | Huss et al. | ................... | 310/180 |
| 5,691,590 A * | 11/1997 | Kawai et al. | ................ | 310/180 |
| 5,747,910 A * | 5/1998 | Haner | ......................... | 310/180 |
| 2005/0264123 A1* | 12/2005 | Maeda et al. | ................ | 310/180 |

FOREIGN PATENT DOCUMENTS

GB         2124986 A   *  2/1984
JP       11332151 A   * 11/1999

* cited by examiner

*Primary Examiner*—Joseph Waks
(74) *Attorney, Agent, or Firm*—Woodcock Washburn, LLP

(57) ABSTRACT

An electric motor may include a plurality of stationary field coils. The field coils are disposed so that they are overlap and are nested with adjacent field coils. A portion of each coil is disposed above a portion of an adjacent coil, and a portion of each coil is disposed beneath another adjacent coil. The average radial distance of the coils from the rotational center of the motor rotor is substantially the same. This arrangement of coils facilitates rotation of the rotor at relatively high speed for applications such as flywheel storage batteries because it reduces or eliminates variations in the torque produced by the coils. In an embodiment, the coils are bent so that they are nested. By bending the coils, the coils overlap and the air gap within the motor is minimized.

20 Claims, 2 Drawing Sheets

HIGH SPEED MOTOR COILS

This application is a continuation of application Ser. No. 10/635,055 filed Aug. 6, 2003 now abandoned, which is a continuation of application Ser. No. 09/956,315 filed Sep. 19, 2001, now abandoned, the entirety of which is incorporated herein by reference

FIELD OF THE INVENTION

This invention relates to high-speed motors that have unique coil arrangements for operating at high speeds.

BACKGROUND OF THE INVENTION

Motors generally include a rotor and a plurality of coils that define a motor field. Running through the motor field is a three-phase electrical current. Although some motors have the motor field defined within the rotor, some motors have the field disposed within the stator. Particularly, flywheel type motors have a rotating flywheel for storing electrical power, field coils disposed in a stator, and magnets disposed in the rotor. The electrical current flowing through the stator field windings exerts a force on the rotor magnets, which causes the rotor and its flywheels to rotate.

Flywheels store power by rotating at relatively fast speeds such as 60,000–90,000 rpm. They can act as a battery by storing electrical power, and then discharging the electrical power by slowing down and producing a current in the field windings. Rotating flywheels at relatively high speeds presents difficulties. These difficulties limit the flywheel's rotational speed, and therefore the amount of power that can be stored in the flywheel.

One difficult with rotating a flywheel or any rotor at a relatively high speed with a motor is rippling or a variation in the torque which will cause variations in the speed and cause the rotor or flywheel to vibrate excessively or wobble and become damaged. One cause of this is the configuration of field windings in motors. Typically, field windings are disposed in an end to end relationship. The rotor permanent magnets experience a change in torque when passing the coil ends. The rotor tends to slow down as it passes by one of the coil ends and then accelerates as it begins to pass by another adjacent coil end. This can cause cogging of the rotor, which is detrimental to the rotor and can result in structural failure. Torque ripple can also excite resonances in the flywheel or other parts of the assembly. Another problem with motors is eddy currents. When rotating fast enough, eddy currents can nullify the driving force or generate sufficient heat so as to cause structural failure.

This invention includes motors that rotate rotors at relatively high speeds. In some embodiments, the problems encountered in the prior art with cogging and eddy currents are reduced or eliminated.

SUMMARY OF THE INVENTION

The motor of this invention includes a rotor and a stator having field windings. The rotor has a plurality of permanent magnets that from the motor poles. In a preferred embodiment, the rotor has four poles, but the motor may have any number of poles. Three-phase alternating current is supplied to the motor windings to rotate the rotor. Although this invention has broad application and can be used with a variety of motors, the flywheel may have one or more motors attached to the rotor.

The motor stator is preferably disposed about the motor rotor, but the motor could be an annulus that is disposed around the motor stator. The motor stator has a plurality of windings. Each winding is preferably disposed so that a portion of the winding overlaps an adjacent winding. The windings are preferably curved so that a first part of the winding is disposed on an outer radius from the rotor center of rotation, and a second part of the winding is disposed along a smaller radius. The second part is preferably disposed beneath or inward of a first part of another winding.

This overlapping coil configuration is beneficial because there are no coils that are disposed in an end to end configuration. Thus, the jogging or change in torque when the rotor passes by an end of a magnet is eliminated. A more even or constant torque is generated by the field windings during the 360-degree rotation of the rotor.

In another preferred embodiment, each of the coil windings may further have a jogged or bent portion that connects the first part to the second part. The jogged or bent portion permits the windings to be more closely nestled. This reduces the air gap and the size of the motor, which makes the motor more efficient.

In yet another preferred embodiment, the coils so that the left end of each coil overlaps a portion of the right end of an adjacent coil. This eliminates the between the coils, which further reduces the air gap. This improves efficiency and the smoothness of the torque, which prevents or eliminates cogging.

Other features of the invention are set forth below.

DETAILED DESCRIPTION OF THE PREFERRED EMBODIMENTS

Figure 1:
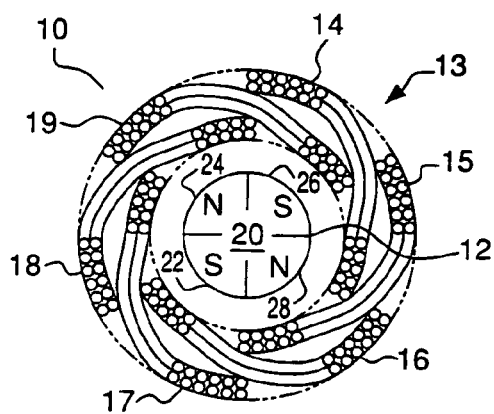
FIG. 1 is a schematic cross-section of a motor according to a first preferred embodiment of this invention.
Figure 7:
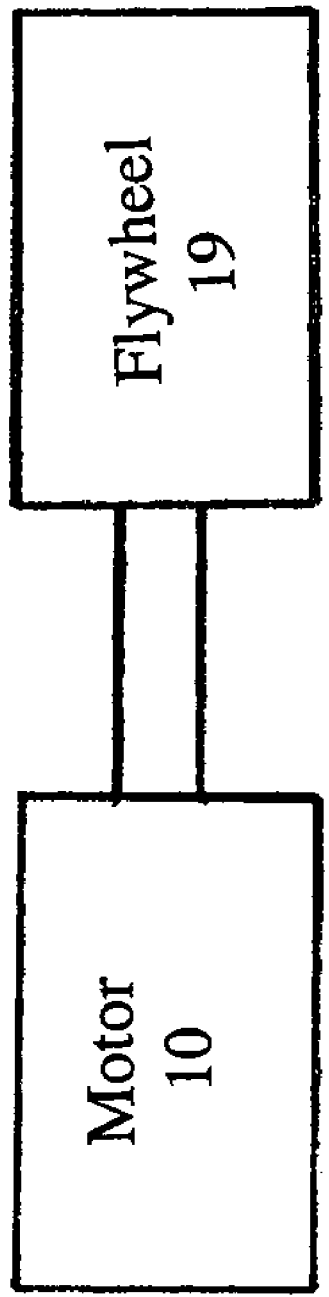
FIG. 7 is a diagrammatic side view of the motors shown in FIGS. 1–6, and a flywheel coupled to the motor.

A schematic cross-section of an embodiment of this invention is set forth in FIG. 1. The motor 10 of this invention preferably includes a rotor 12 and a stator 13 as shown in FIG. 1. FIG. 1 is a cross-sectional schematic depiction of the motor rotor 12 and stator 13. Attached to the rotor 12 may be one or more flywheels 19 (see FIG. 7). The rotor 12 includes permanent magnets. The rotor 12 may have any number of permanent magnets. In the preferred embodiment, the rotor 12 has four permanent magnets 22, 24, 26, 28. Two of the magnets 24, 28 are north poles, and two of the magnets 22, 26 are south poles. Although each embodiment set forth below is described as having a rotor 12 disposed inside of a stator 13, it will be appreciated that the rotor 12 could be an annulus that is disposed radially outward of the stator 13.

The stator 13 has a plurality of coils 24, 26, 28, 30, 32, 34 that are in the preferred embodiment field windings. These coils 24, 26, 28, 30, 32, 34 are disposed circularly about the rotor 12. Preferably, the coils have three phase alternating current; each pair of windings has a different phase. Coils 24 and 26 are phase A. Coils 28 and 30 are phase B, and coils 32 and 34 are phase C. In the preferred embodiment, the coil wires are relatively thin or "Litz" copper wire. The coil wires preferably but need not have a cross-section on the order of 0.008 inches at a speed of 90 rpm. The coil wire cross-section can vary depending upon the operating speed. This wire is preferred because it is easy to form and resistant to the generation of eddy currents.

Figure 2:
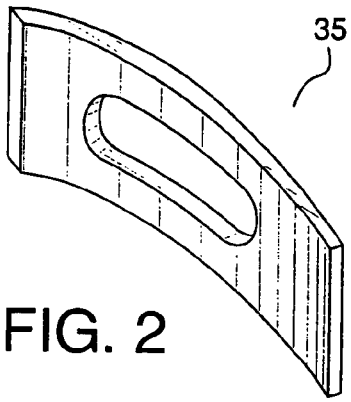
FIG. 2 is a schematic perspective view of a stator coil of the embodiment of FIG. 1.

The coils of FIG. 1 are preferably substantially curved or arc-shaped. Coil 35 of FIG. 2 is a schematic drawing of the curve or arc shaped coils 24–34 of FIG. 1. Because the coils 24–34 are curved, the coils 24–34 fit over one of the adjacent coils and under the other adjacent coils as shown in FIG. 1. This permits nesting of the coils. This overlapping coil configuration is beneficial because there are no coils that are disposed in an end to end configuration. Thus, the cogging or change in torque when the rotor passes by an end of a magnet is eliminated. A more even or constant torque is generated by the field windings during the 360-degree rotation of the rotor.

The overlapping coil arrangement of FIG. 1 is also beneficial because the average distance that each coil is from the rotor centerline of rotation is equal or substantially equal. By equalizing this distance or the radius, each coil will produce the same or substantially the same torque when the same current is applied. This eliminates or minimizes any torque ripple or cogging which would be created if the coils had different moment arms—i.e. radii. Another benefit of overlapping coils is that it reduces or minimizes electrical harmonics that are found in conventional motors.

In the preferred embodiment, the motor 10 is a four-pole three-phase AC motor. This is, however, only a preference, and those skilled in the art will recognize that the motors of this invention may have any number of poles or phases.

Figure 3:
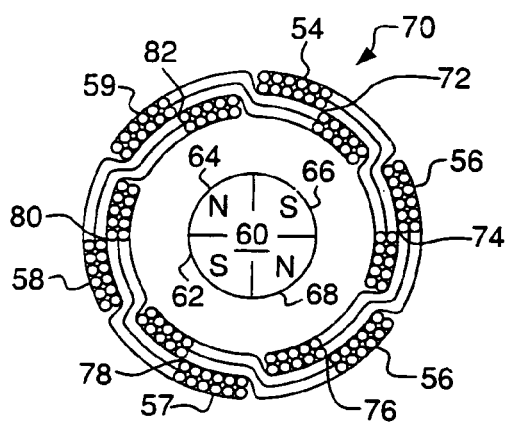
FIG. 3 is a schematic cross-section of a motor according to a second preferred embodiment of this invention.
Figure 4:
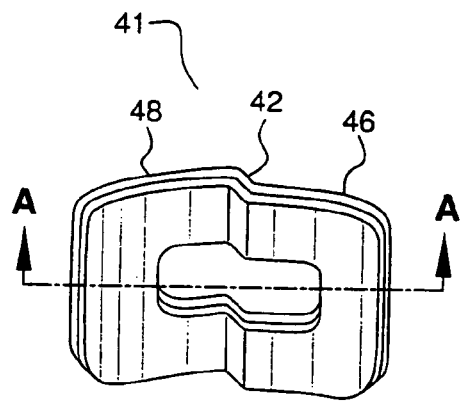
FIG. 4 is a schematic perspective view of a stator coil of the embodiment of FIG. 2.

Another preferred embodiment of this invention is set forth in FIG. 3. This embodiment also has overlapping stator coils 54, 55, 56, 57, 58, 59. In addition in this embodiment the coils 54, 55, 56, 57, 58, 59 are bent or have "jogged in" portion which is best shown in FIG. 4. Coil 41 is exemplary of coils 54–59. Coil 42 has a first portion 40, a second portion 46 and a bent or jogged in portion 42. This structure is illustrative, and it will be appreciated that the broad concepts of this invention include any jogged in or bent portion that reduces the stator size and motor air gap.

This bent shape is beneficial because the coils can be positioned proximate to other coils, which reduces the overall diameter of the motor stator field windings and the air gaps between the windings. Reduction of the air gap increases motor efficiency and creates higher magnetic flux densities. The reduction in the air gap is best understood be comparing the embodiments of FIGS. 1 and 3. As shown in FIG. 4, the bent coils are disposed in an overlapping arrangement, and therefore, they have the benefits of overlap described above with reference to the coils of FIG. 1.

Figure 5:
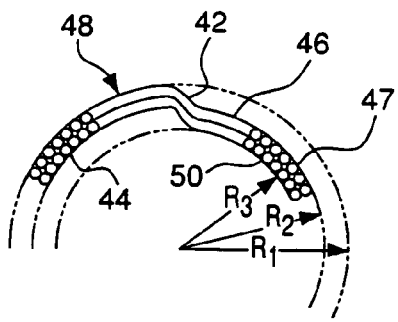
FIG. 5 is schematic cross-section of a motor with the coil of FIG. 4.

FIG. 5 is cross-sectional schematic of the winding of FIG. 4 in a motor and depicts the varying radii of the three portions 40, 42 and 46 from the rotor centerline as the windings are wrapped about the rotor. It will be appreciated that this embodiment is illustrative of the broader concept of bending windings to create a nesting arrangement that reduces the air gaps in the motor. In this embodiment, the coil first portion 40 is the outer radial portion of the winding, as best understood with reference to FIG. 5. The coil second portion 46 is disposed radially inward at a smaller radius than the first portion 40. Ends 44 and 47 of the respective coil portions are at the respective outer and inner radii.

Figure 6:
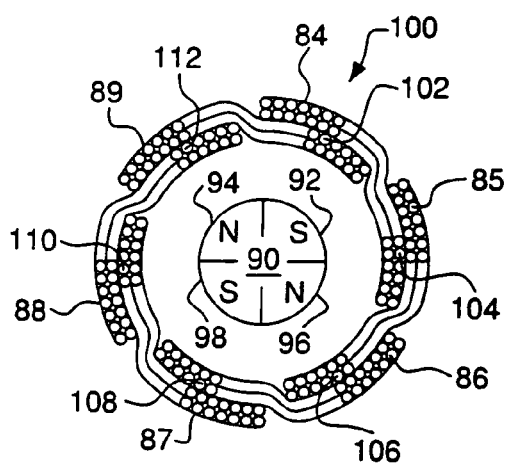
FIG. 6 is a schematic cross-section of a motor according to a third preferred embodiment of this invention.

FIG. 6 is a third preferred embodiment of this invention. FIG. 6 is similar to the embodiment of FIG. 5 in that it has overlapping-bent coils. In the embodiment of FIG. 6, however, the coils 84, 85, 86, 87, 88, 89 are disposed so that they have more overlap than in FIG. 5. In the arrangement of FIG. 5, it is desirable for efficiency purposes for the space between the left end of each coil and the right end of the coil two behind it—the space between where a center portion of another coil passes—to be as small as possible while permitting the passage of a coil through it. Moreover, it is desirable to reduce the spaces 72, 74, 76, 78, 80, 82 in the center of portions of adjacent coils. This improves efficiency and the smoothness of the torque, which prevents or eliminates cogging.

The embodiment of FIG. 6 addresses these concerns. As shown in FIG. 6, the coils 84, 85, 86, 87, 88, 89 have been shifted counter clockwise relative to FIG. 5 so that the left end of each coil overlaps a portion of the right end of an adjacent coil. This eliminates the spaces 72, 74, 76, 78, 80, 82 of FIG. 5.

The motors of this invention may have a variety of applications, including but not limited to vehicles, cars, satellites, power generating stations, solar power storage and flywheels. When used with flywheels, the flywheels can be coupled to the rotor to rotate with the rotor. As the flywheel spins, the flywheel can store energy, and when needed the flywheel slows down to produce transmit the stored energy back into electricity. Thus, the flywheel serves as a storage battery. Although the motor of this invention is preferably employed with members rotating at high-speeds, its application is not so limited.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An electric motor comprising field windings comprising a first coil, a second coil, and a third coil, the first coil being disposed adjacent to the second and third coils and comprising a first portion which is disposed over a first portion of the second coil and a second portion that is disposed under a first portion of the third coil, and the second coil further comprising a second portion that is disposed over at least a second portion of the third coil, wherein the first, second, and third coils each have a non-uniform radius of curvature.

2. The motor of claim 1, wherein the first, the second, and the third coils each comprise a first portion, a second portion, and a bent portion adjoining the first and second portions so that the first portion extends through a first arc and the second portion extends through a second arc radially offset from the first arc.

3. The motor of claim 1, wherein the average distance of the first, the second, and the third coil from a center of rotation of a rotor is substantially the same.

4. The motor of claim 1, wherein the coils are disposed about a rotor.

5. The motor of claim 4, further comprising at least one flywheel coupled to the rotor so that the flywheel rotates with the rotor.

6. The motor of claim 1, wherein the coils define the field windings.

7. The motor of claim 1, wherein the first, the second and the third coil each comprise a bent shape.

8. A motor comprising a plurality of field winding coils, each of the field winding coils having a first portion that is below a first adjacent field winding coil and a second portion that is above a second adjacent field winding coil, wherein each of the field winding coils has a non-uniform radius of curvature.

9. The motor of claim 8, wherein the coils are disposed about a rotor.

10. The motor of claim 9, further comprising at least one flywheel coupled to the rotor so that the flywheel rotates with the rotor.

11. The motor of claim 10, wherein the average distance of the first, the second, and the third coil from a center of rotation of a rotor is substantially the same.

12. The motor of claim 9, wherein each of the coils further comprises a bent portion that is disposed between the first and second portions of the coil so that the first portion extends through a first arc and the second portion extends through a second arc radially offset from the first arc.

13. The motor of claim 9, wherein the rotor is disposed radially inward of the stator.

14. The motor of claim 9, wherein each coil further comprises a first end and a second end, and wherein the first end of each coil overlaps the second end of an adjacent coil.

15. A motor, comprising:
   a rotor comprising a plurality of poles;
   a stator comprising
      a first winding comprising a first portion and a second portion and a bent portion between the first and second portions so that the first portion extends through a first arc and the second portion extends through a second arc radially offset from the first arc; and
   a second winding comprising
      a first portion that is disposed beneath and radially inward of the first winding first portion,
      a second portion that is disposed substantially the same radial distance as the first winding first portion; and
      a bent portion that connects the second winding first portion to the second winding second portion so that the first portion of the second winding extends through a third arc and the second portion of the second winding extends through a fourth arc radially offset from the third arc.

16. The motor of claim 15, wherein the rotor is disposed radially inward of the stator.

17. The motor of claim 15, wherein a first end of the first winding first portion overlaps a second end of the second winding first portion.

18. The motor of claim 15, further comprising a third winding comprising a first portion that is disposed beneath the second portion of the second winding.

19. The motor of claim 15, further comprising at least one flywheel coupled to the rotor.

20. The motor of claim 15, further comprising multiple set of windings each multiple sets of windings being disposed in an overlapping relationship with two windings.

\* \* \* \* \*